Nov. 14, 1950  J. SCHMIDINGER  2,529,971
METHOD AND APPARATUS FOR THE PRODUCTION
OF BEAD AND WIRE ASSEMBLIES
Filed July 31, 1946  2 Sheets-Sheet 2
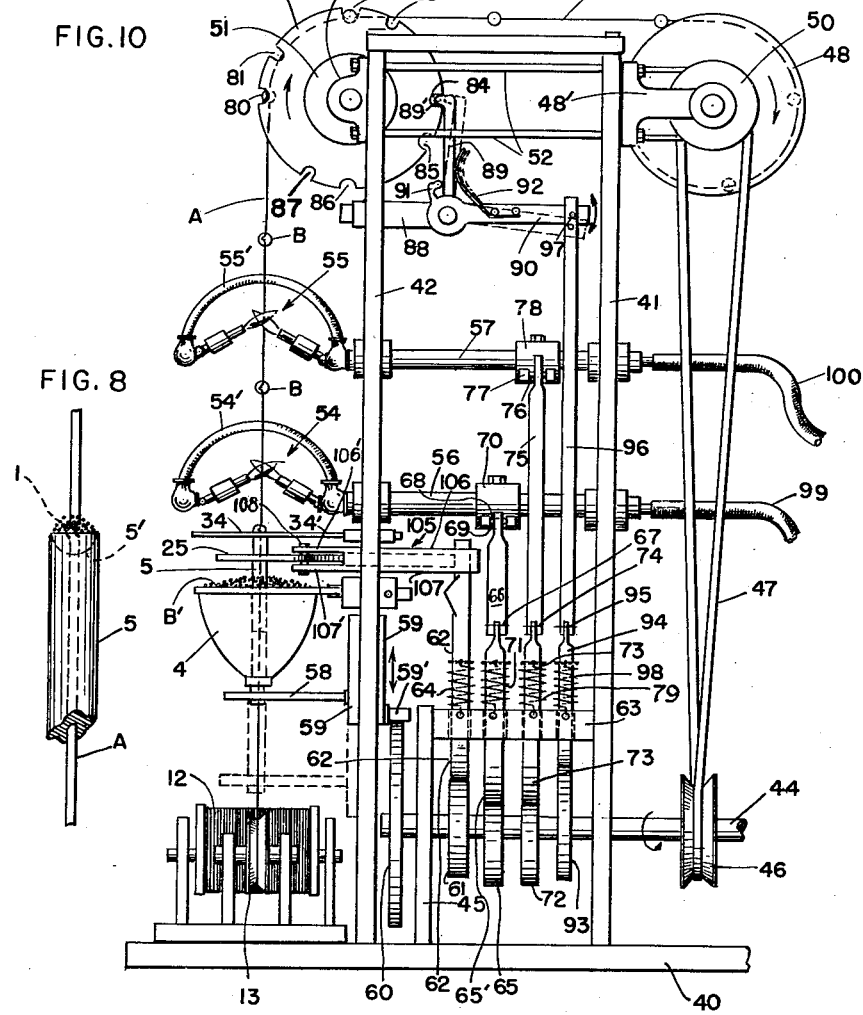
INVENTOR,
JOSEPH SCHMIDINGER
BY
Bartlett, Eyre, Keel & Weymouth
HIS ATTORNEYS Patented Nov. 14, 1950

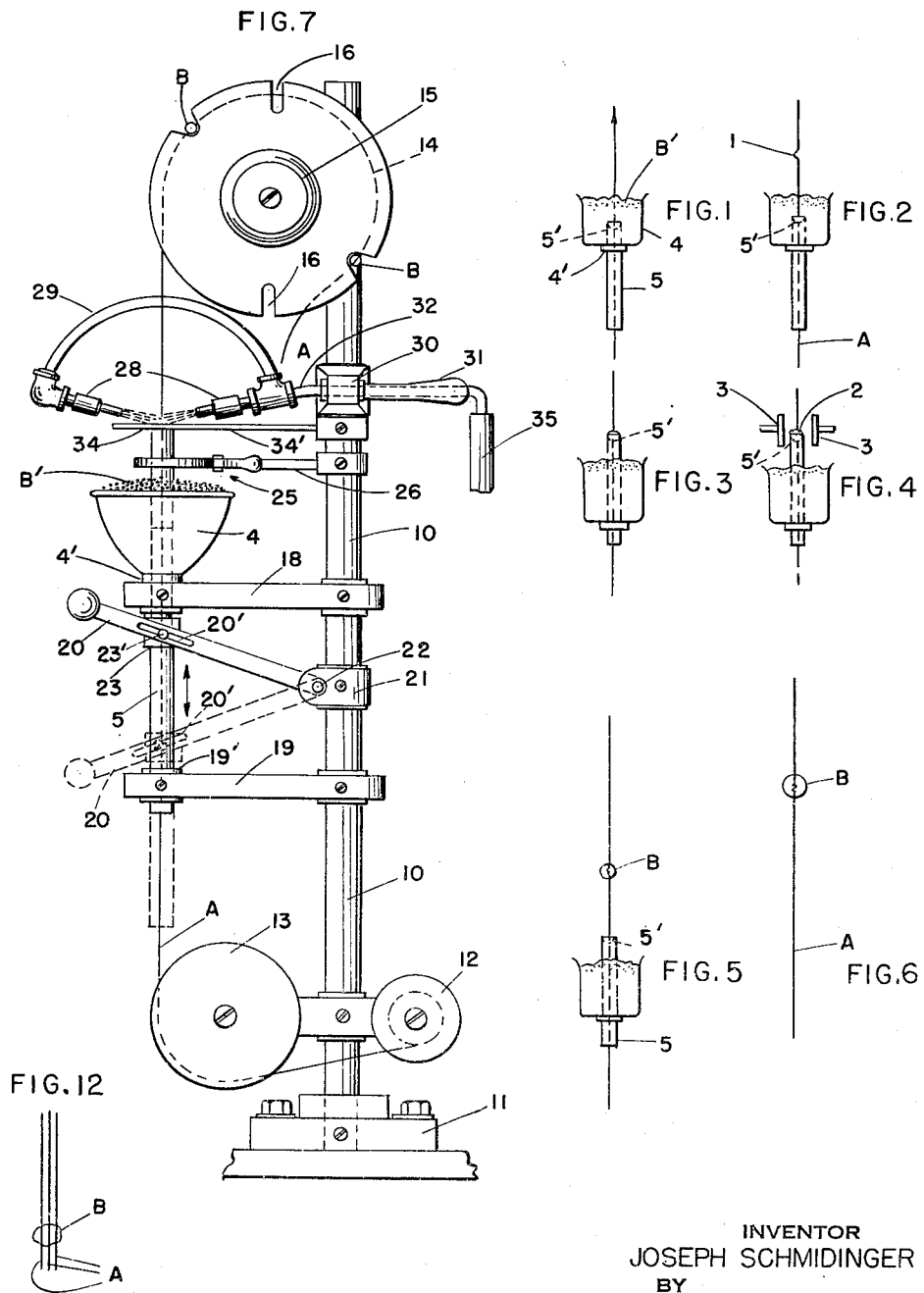

2,529,971

UNITED STATES PATENT OFFICE 2,529,971

METHOD AND APPARATUS FOR THE PRODUCTION OF BEAD AND WIRE ASSEMBLIES

Joseph Schmidinger, Lake George, N. Y.

Application July 31, 1946, Serial No. 687,334

15 Claims. (Cl. 49—1)

This invention relates to the manufacture of bead and wire assemblies and particularly assemblies of glass beads and metallic wire. One of the uses of such wire assemblies is for hot or pull wire switches.

One object of the invention is a novel and improved method of forming these assemblies.

Another object of the invention is a method of producing such bead and wire assemblies which particularly lends itself to quantity production accompanied by reduced cost of manufacture.

A further object of the invention is a novel and improved apparatus for the practice of my invention.

Further objects of the invention will hereinafter appear.

For a better understanding of the invention, reference may be had to the accompanying drawings forming a part of this application, wherein Figs. 1 to 6 are schematic views illustrating steps in the method of the invention;

Fig. 7 is a schematic view of one embodiment of an apparatus for practicing the invention;

Fig. 8 is a detail thereof;

Fig. 9 illustrates diagrammatically another embodiment of apparatus for practicing the invention;

Fig. 10 is a detail view of the wire kinking or offsetting mechanism;

Fig. 11 is a view diagrammatically showing one arrangement of driving cam shaft and cams; and Fig. 12 is a view of a modification showing the application of the invention to multiple wire beading.

Referring to Figs. 1 to 6, I have illustrated diagrammatically a metallic wire A upon which are to be formed glass beads B at intervals along the metallic wire A. In one aspect of the invention, the invention resides in first forming about kinks I of the wire A masses of granular fusible material as, for example, of glass, such as that indicated at 2 in Fig. 4 and then fusing these masses 2 of granular glass or similar material about the kinks I of the wire. As shown in Fig. 4 of the drawings, heaters 3 are illustrated for fusing the masses of granular glass 2 on to the wire A at a kink I. These heaters 3 may assume any form as, for example, electrostatic plates for melting the small mass of granular material by high frequency electronic heating. A finished bead is illustrated at B in Figs. 5 and 6.

In another aspect of the invention it resides in the series of steps diagrammatically illustrated in Figs. 1 to 6 and including the steps of measuring the masses or bodies of granular fusible material and bringing the kink I of the wire into a mass of glass thus measured and surrounding the kink. For this purpose there is shown diagrammatically a container or receptacle 4 for the granular glass which is used to form the beads B, and a relatively movable die or measuring device 5 is provided which, cooperatively with the granular glass container 4, measures the exact quantities of granular glass desired for each bead. This measuring device 5 is provided with a cup 5' at its upper end (Fig. 8) and is provided with an opening centrally and longitudinally thereof for the passage of the wire A, the latter fitting closely enough in the opening to prevent granules of glass from passing downwardly by gravity through the opening. The container 4 is provided with a bearing and sealing ring 4' about an opening formed in the bottom of the container for the reception of the die or measuring device 5 and the members 4 and 5 are given relative movements to fill the cup 5' with a mass of granular glass and relative movements of the members 4 and 5 and the wire A are imparted thereto to bring the cup 5' which contains the mass of granular glass to a kink I previously formed in the wire A. In the particular embodiment shown in Figs. 1 to 6 the container 4 is stationary and the die measuring member 5 is relatively movable, first, to bring the upper end or cup 5' of the die member down into the mass of glass B' contained in the container 4, as shown in Fig. 1, and then to elevate the die measuring device 5 to the position shown in Figs. 3 and 4 for subjecting the assembly of the wire kink and the mass of granular glass to heating by the heaters 3 to melt or fuse and anchor the same to the wire as illustrated in Fig. 4. Before the measuring device 5 is elevated to the heating position the kink I is formed in the wire A. After the fusing in Fig. 4 the wire A is drawn upwards to bring the fused bead to the elevation shown in Fig. 5. In the position shown in Fig. 5 the bead B may be subjected to further heating if desired. Fig. 6 shows a complete wire length A and bead B. Following the position shown in Fig. 5 the die measuring device 5 is moved downwardly to the position shown in Fig. 1 and the operations above described are then repeated, the beads B being if desired, formed on a continuous wire which may be later severed into the desired lengths.

In Fig. 7 I have illustrated an apparatus or device for assisting in practicing the method of this invention. This apparatus or device is somewhat diagrammatically illustrated. It comprises a standard 10 mounted on a base 11 and carrying at the lower end thereof a reel or spool of wire 12 from which the wire A is passed about a guide wheel 13 and carrying at its upper end a wheel 14 for taking up the wire A with the beads B formed thereon. The wheel 14 is provided with a suitable knob 15 whereby the wheel 14 may be rotated to feed the wire A upwardly after each bead is completed. The wheel 14 is provided with a notch or notches 16 whereby a wire length with its bead B may be severed at this point. The receptacle or container 4 for the granular glass B' is carried by a bracket arm 18 extending outwardly from the standard 10 at a point intermediate its length. The die measuring device 5 is guided at its upper end in its relative upward movements by the bearing 4' carried by the container 4 and at its lower end by a bracket arm 19 extending out from the standard 10 and having a bearing 19' at its outer end through which the member 5 is guided. The member 5 is provided with a collar 23 and a hand lever 20 is pivoted on a bracket 21 carried by the standard 10 at 22 for engaging the collar 23 and reciprocating the die measuring member 5 in vertical directions. A slot 20' is provided in the lever 20 which is in cooperative engagement with a pin 23' formed on the collar for forming a drive connection between the lever 20 and the die measuring device 5. By means of this lever 20 the die member 5 may be moved to the full line position indicated to bring the cup 5' to the heating and fusing position or to the dotted position shown to bring the cup 5' down within the granular glass B' contained in the container 4. At 25 and just above the container 4 is located a wire pincher which produces the small kinks 1 in the wire A, around which the beads are to be formed. This wire pincher may be of any suitable and conventional character and the details of it are omitted for convenience in illustration. It is carried by a supporting arm 26 fastened to the standard 10 in any suitable manner.

Heating means are indicated at 28 and in the particular embodiment shown these heating means are gas burners for causing flames to play upon the granular measured mass of glass contained in the cup 5' of the measuring device 5. These heaters are carried as a unit by a frame member 29 which is pivotally or swingably mounted at 30 on the standard 10 and a handle 31 is provided for actuating the burners 28 from the operative position to the inoperative position. If desired the frame 29 may be mounted on the pivotal mount 30 by means of a bent arm 32 to assist in bringing the burners 28 into and out of operative relation with the mass of granular glass being fused to a kink in the wire. If desired there may be provided a fire shield 34 disposed just below the flames from the burner 28 and at the uppermost position of the upper end of the die measuring member 5 to prevent it from becoming overheated. This fire shield 34 is indicated as supported by an arm 34' projecting outwardly from the standard 10 and is provided with an opening to accommodate the device 5. The fuel supply for the burners 28 is indicated at 35 and the fuel passes through the handle 31, the pivotal mount 30 and hollow bent arm 32, to and through the fittings shown and hollow support frame member 29 to the burners.

The operation of the mechanism of Fig. 7 is as follows. After the fusing of the measured quantity of granular glass about a kink in the wire the burners 28 are shifted out of operative position as by rotating or swinging the handle 31, or both about the mount 30. The die measuring device 5 is dipped or lowered by manipulating the handle 20 to the dotted position shown. With the wire A adjusted by rotating wheel 14 to the position where a kink is to be formed in the wire the kinking means 25 are operated to form the kink 1. The wheel 14 is then rotated to bring the kink up to the firing line of the burners 28 whereupon the die measuring device 5 is then moved upwardly to bring the tip into the firing line of the burners with the measured quantity of granular glass within the cup 5' surrounding the kink. The burners 28 are then brought into position to fuse the measured quantity of granular glass about the kink in the wire. Similar operations are repeated with the wire assemblies being formed in the simple manner indicated.

In Fig. 9 there is illustrated another embodiment of apparatus for practicing the method described above. This apparatus is purposely shown diagrammatically with details omitted for convenience in illustration. The frame comprises a base 40 upon which are mounted two vertical frame members 41 and 42. Upon the base is mounted a frame for carrying the wire reel 12 and the guide 13 for the wire A. A main drive shaft 44 is journaled in the frame 41 and in a standard 45 projecting up from the base. This shaft carries a pulley 46 which through a belt 47 operates a wind-up wheel 48 for the finished unsevered bead and wire assemblies. Through the wheel 48 a notched wheel 49 is driven in unison therewith, these wheels 48 and 49 being supported on brackets 48' and 49', respectively. Both wheels 48 and 49 are connected by controllable side frictions to pulleys 50 and 51, the pulleys 50 and 51 being driven in unison by the belt 52 and belt 47. Thus the pulley 50 is driven from the cam or main shaft 44 through the belt 47 and the pulley 51 is driven by the belt 52 from the pulley 50. The pulleys 50 and 51 as indicated, are not rigidly connected with the wheels 48 and 49 but are frictionally coupled thereto so as to provide for slippage and thereby prevent breakage of the wire A. In this embodiment there are provided two burners 54 and 55 carried respectively by tubular frames 54' and 55'. These burners are carried and operated respectively by tubular shafts 56 and 57 which are journaled in the frames 41 and 42 for rotation therein and the arrangements of the burners 54 and 55 are such that by rotating the shafts 56 and 57 the burners may be actuated to positions to cause the flames to play respectively upon the measured mass of granular glass and upon a fused mass previouly formed or they may be brought to a position entirely out of the path of the wire A.

In this embodiment the die measuring device 5 is fixed to and carried by an arm 58 which in turn is carried by a reciprocating slide member 59, this slide member 59 being mounted in any suitable manner in guideways formed in the frame member 42. In its uppermost position the slide or carriage 59 brings the tip of the die measuring device just above the fire shield 34 and in its lowermost position brings it down to the dotted position shown with the tip 5' immersed in the body of glass granules carried by the container 4.

In this embodiment the driven cam shaft 44 forms the drive for all of the operations in the forming of the beads on the wire A and advancing the latter. A cam 60 is provided on the shaft 44 for raising and lowering the slide 59 at the required times to bring the tip 5' of the measuring device or die 5 to the fusing line in cooperation with burner 54 and to bring it to the lower position for filling the tip measuring cup 5' for the formation of another bead. For this purpose the slide 59 is provided with a lug or finger 59' which rests upon the cam wheel 60 by gravity or if desired it may be biased in the conventional manner to thus bear on the cam 60. The pinchers 25 are also operated by the shaft 44 at the required time, namely when the measuring die is in its lowermost position, to form the kink 1 in the wire. This is effected by a cam 61 which operates a vertically movable actuator 62.

This actuator 62 is slidably mounted in a frame member 63 supported by the frame members 41 and 45. The lower end of the actuator 62 is maintained in contact with the cam 61 and for this purpose may be biased in any manner as, for example, by a spring 64 fastened at one end to the frame 63 and at its upper end to the actuator 62. The arrangement is such that when the actuator 62 is actuated in the upward direction to operate the pinchers 25 to form the kink in the wire the spring 64 is put under tension to bias the actuator against the cam in all of its positions.

The tubular shaft 56 which carries and manipulates the burners 54 from one position to another is actuated by cam 65 on the shaft 44, a vertically movable actuator 65' slidably mounted in the frame member 63, a connecting link 66 which is pivotally fastened to the upper end of the actuator 65' by means of the pivotal connection 67 is pivotally connected at its upper end at 68 to an arm 69 projecting out from a collar member 70 fastened to the tubular shaft 56. The lower end of the vertically movable actuator 65' is maintained in engagement with the cam 65 in any suitable manner as, for example, by a spring 71 fastened at its upper end to the actuator 65' and at its lower end to the frame member 63. Similarly the burner unit 55 is actuated by a cam 72 on the shaft 44 which actuates a vertically movable actuator 73 slidably mounted in the frame member 63. This actuator 73 is pivotally fastened at 74 at its upper end to a link member 75 which is pivotally connected at 76 at its upper end to an arm or bracket 77 carried by a collar or sleeve 78 fastened to the tubular shaft 57. A biasing spring 79 similar to the springs 64 and 71 is illustrated for yieldingly maintaining the lower end of the actuator 73 in engagement with the cam 72. In the positions of the tubular shafts 56 and 57 shown in Fig. 9 the burner units 54 and 55 are in a position such that the burner flames are removed from the wire A so as not to play upon the wire.

As above described the wheels 48 and 49 are frictionally coupled with the pulleys 50 and 51, respectively and in the particular embodiment shown the wire A is held stationary by locking one or both of the wheels 48 and 49 against movement and in the embodiment shown means are provided for locking the wheel 49 against rotation during the wire-kinking operations and the bead-forming operations. This means comprises in the embodiment shown a multiple number of pairs of equally spaced notches, there being four such pairs of notches, these pairs of notches being designated by the numerals 80, 81; 82, 83; 84, 85; 86, 87, these notches being formed on the periphery of the wheel 49. A supporting frame member 88 projects inwardly from the standard 42 and supports a latch member 89 having a toe 89' adapted to follow the periphery of the wheel 49 and to rest in the notches successively as the wheel 49 is rotated in the direction of the arrow. This latch 89 is pivotally fastened at its lower end to the frame 88. The support 88 also has pivotally fastened thereto an actuating arm 90 for actuating the latch 89 into a position as shown in dotted lines to permit the rotation of the wheel 49. For this purpose the arm 90 is provided with a finger or actuating lug 91 which when the arm 90 is actuated downwardly about its pivotal point is adapted to engage the latch 89' on its left-hand side to positively move it to a position where the holding toe 89' is out of the notch. When the arm 90 is again actuated to the full line position shown in Fig. 9 the latch 89 is released by the lug 91 so as to permit the latch to engage the next notch as the wheel 49 is rotated. A spring 92 carried by the actuating arm 90 biases the latch 89 in the counterclockwise direction to cause it to follow the periphery of the wheel 49 and to drop into the next notch. The arm 90 is actuated at the required times by a cam 93 mounted on the shaft 44 and actuating a vertically movable actuator 94 which is connected for vertical movements in the frame member 63. This vertical actuator 94 is pivotally attached at 95 to a vertically extending link 96 whose upper end is pivotally fastened at 97 to the actuating arm 90 for actuating the same, it being understood that the pivotal connections 95 and 97 are such as to prevent binding during operation as, for example, by being provided with sufficient lost motion for this purpose. The vertical actuator 94 is yieldingly maintained in engagement with the actuating cam 93 by means of a spring 98 attached at one end to the actuator 94 and at the other end to the frame member 63, this spring biasing the member 94 in a downward direction similarly to the operation of the springs 64, 71 and 79.

At 99 and 100 are illustrated gas or other fuel connections leading respectively to the tubular shafts 56 and 57 for supplying fuel to the burner units 54 and 55.

Referring to Fig. 10 the pinchers 25 are carried by a frame 105 which in turn is carried by the standard 42. This frame 105 is formed of upper and lower mating parts 106 and 107 fastened together by any suitable means as, for example, by the bolts indicated. These parts 106 and 107 are provided with extensions 106' and 107' respectively which are spaced from each other to accommodate the pinchers 25 and these pinchers 25 are pivoted to the extensions 106', 107' by means of a pivot 108. The pincher jaws are provided with cooperating male and female pinchers 109 and 110 for engaging the wire A and forming the kinks 1 therein. The pincher jaws are yieldingly biased to open position by means of a spring 111 and are provided with rearward extensions 112 which are engaged by a wedge-shaped cam 113 formed on the end of a plunger 114, the latter being movable toward and away from the pinchers to actuate them against the tension of the spring 111 and being housed within the pincher actuating frame 105. The frame 105 is provided with an opening rearwardly of the plunger 114 through which passes the vertically movable actuator 62 and the latter is provided with a cam 62' which engages the right-hand end of the plunger 114 to actuate the pinchers. The spring 111 functions to bias the jaws of the pinchers to open position and to push back the plunger 114 and the cam 113 when the actuator 62 is lowered from its uppermost position.

The burner unit 55 need not be used in cases where the burner unit 54 completely forms the bead B at the first fusing operation. As indicated above, the drawings are intended to be diagrammatic and it is understood that the relative positions of the burner unit 54, the pinchers 25 and the notches on the wheel 49 are such as to have the beads formed on the wire A at the desired distances apart and further that the actuating cams 60, 61, 65, 72 and 93 are constructed and disposed relatively to each other so as to coordinate with the wire-kinking, die-filling, die movement, firing and wire-feeding operations desired. In the particular embodiment shown the die member 5 must be lowered below the pinchers 25 to permit the forming of a kink in the wire A and of course the wire must be adjusted so as to effect the formation of the kink at the desired point in the wire. In Fig. 9 as shown the latch 89 is in engagement with notch 84 in the wheel 49. This corresponds to the firing and fusing position. Following the firing and fusing of the bead to the wire the burner 54 is swung away by the cam 65 and the latch 89 is acuated to release the wheel 49 which makes an angular movement equal to the arcuate distance between the notch 84 and 83 which corresponds generally to the spacing of the beads on the wire. Immediately following or coincident with this wire feeding operation the die 5 is dipped to take on a new charge of granular material. Immediately following the kinking of the wire by the pinchers the wire is fed again by releasing the latch 89 a distance corresponding to the distance between the pairs of notches formed in the wheel 49, namely with the latch engaging the notch 82. This brings the newly formed kink of the wire to the firing line of the burner unit 54. The burner 54 is then swung into position by the cam 65 to fuse the granular charge to the form of a bead about the wire at the kink. After this fusing operation the burner is again swung away and the wire A fed again a distance corresponding to the arcuate distance between an even numbered notch and the succeeding odd numbered notch of the wheel 49 through the longer distance. In the particular embodiment shown therefore the beads B are formed on the wire A at distances apart corresponding to the arcuate distance of the wheel 49 embracing three notches. By substituting a wheel 49 of differently spaced notches and by coordinating such a wheel with the relative positions of the kinking and firing lines of the machine and other parts thereof different spacings of the beads may be effected. In the particular embodiment shown and when the burner 55 is utilized, its firing line is spaced from the firing line of the burner unit 54 a distance corresponding to the spacing of the beads on the wire and in the particular embodiment shown the spacing of the kinks and beads as indicated above is effected in two steps, one a longer step following the fusing of the bead and the other a shorter step wherein the kink formed by the pinchers 25 is moved up to the firing line of the burner 54.

In Fig. 11 I have shown diagrammatically cam structures generally of a shape and generally relatively positioned to impart the required and timed movements to the various coordinated devices but it is understood that the invention is not limited to any particular means of coordinating the various cooperatively functioning mechanisms and devices of the machine. In this particular embodiment the cam 60 is provided with a single dip 120 which permits the slide or carriage 59 to be lowered to bring the die 5' down within the body of the granular material B' contained in the reservoir 4. The cam 61 embodies a single raised part 121 which effects a quick upward and downward movement of the pincher actuator 62. The cams 65 and 72 which in the particular embodiment shown are identical are provided each with a continuous elevated portion 122 and a continuous lower portion 123 of approximately equal arcuate distances, the elevated parts 122 of the cams corresponding to the outer firing line positions of the burners 54 and 55. The cam 93 has two dips 124 and 125 which correspond respectively to the release of the latch 89 from the odd numbered notches of the wheel 49 and the even numbered notches of the wheel 49.

The steps as indicated above are generally as follows, starting with first, the wire feeding operation, second, the dipping of the die 5, third, the pinching of the wire to form the kink and fourth, the auxiliary wire feeding operation to move the new kink in the wire to the firing line of the burner 54; fifth, the raising of the die 5' to the firing line, sixth, the swinging of the fires, the lower one 54 to fuse the granules in the tip of the die and the upper one 55 to finish or globulate the raised partially fired bead, and seventh, swinging the fires away to be followed by another wire feeding operation.

It is observed that the positions of the cams in Fig. 11 do not correspond with the positions of the parts shown in Fig. 9. In the positions indicated diagrammatically in Fig. 9 the burners 54 and 55 are just about to be brought into the firing line which would correspond to the position of the cams 65 and 72 where the vertical actuators 65' and 73 are about to run off of the elevated parts 122 of the cams.

While the cams 65 and 72 for convenience in illustration have been shown exactly alike in practice they may be different as, for example, to have one fire no longer than the other and it is understood as indicated above that I am not to be restricted to the particular cam arrangement or time relation.

In the above embodiments of the invention I have illustrated the beads as formed about a single wire. However, two or more wires may be held in parallel with the beads embracing both or more wires and such wire assemblies have many uses as, for example, in hot wire relay switches and the like. In Fig. 12 I have shown a bead formed on a multiplicity of wires, the bead having been formed by first assembling a charge of granular material about the wires and then fused thereto.

I claim:

1. The method of forming a bead on a wire which comprises the steps of assembling together a wire and a die having a charge forming recess, forming an offset portion in the wire, relatively moving the wire and the die to bring the offset portion of the wire in said recess, charging the recess with a charge of granular fusible material and then fusing the granular mass into a solid body about the offset portion of the wire.

2. The method of forming a bead on a wire which comprises the steps of assembling a wire, a container of granular fusible material and a die having a charge forming recess with the container and the die being relatively movable, relatively moving the die and the container to charge said recess with granular material and move the recess clear of the container and then fusing the charge of granular material in the recess about the wire.

3. The method of forming a bead on a wire which comprises the steps of assembling a wire, a container of granular fusible material and a die having a charge forming recess with the wire, the container and the die being relatively movable, forming an offset portion in the wire, relatively moving the die and container to charge the die recess with the granular material and to move the charge to the offset portion of the wire and then fusing the charge into a solid body about the offset portion of the wire.

4. In a means for forming beads on wires, the combination of a container for granular fusible material, a die relatively movable with respect to the container and passing up through the same, said die having a charge forming recess at its upper end and an opening therethrough for passing a wire through the die and said recess and means for fusing charges of granular material in said recess about the wire.

5. In a means for forming beads on wires, the combination of a container for granular fusible material, a die relatively movable with respect to the container and passing up through the same, said die having a charge forming recess at its upper end and means for passing a wire through the die and said recess, means for forming offset anchoring portions in the wire and means for fusing charges of granular material in said recess about the wire.

6. In a means for forming beads on wires, the combination of a relatively fixed container for granular fusible material, a die member which is relatively movable with respect to the container and has at its upper end a charge forming recess, means for reciprocating the die member to dip its upper end within the container to charge the same with granular material and moving the same upwardly to bring the charge thus formed to a predetermined point in a wire, said die having a central opening for the passage of a wire, means for feeding a wire through said central opening and means for fusing the charge of granular fusible material about the wire.

7. In a means for forming beads on wires, the combination of a relatively fixed container for granular fusible material, a die member which is relatively movable with respect to the container and has at its upper end a charge forming recess, means for reciprocating the die member to dip its upper end within the container to charge the same with granular material and moving the same upwardly to bring the charge thus formed to a predetermined point in a wire, said die having a central opening for the passage of a wire, means for feeding a wire through said central opening, means for forming an offset anchoring portion in the wire and means for fusing the charge of granular fusible material about the wire at the offset portion.

8. In a means for forming beads on wires, the combination of a relatively fixed container for granular fusible material, a die member which is relatively movable with respect to the container and has at its upper end a charge forming recess, means for reciprocating the die member to dip its upper end within the container to charge the same with granular material and moving the same upwardly to bring the charge thus formed to a predetermined point in a wire, said die having a central opening for the passage of a wire, means for feeding a wire through said central opening, means for forming an offset anchoring portion in the wire and means for fusing the charge of granular fusible material about the wire at the offset portion comprising a shiftable heating device for bringing the heater into and out of heating position.

9. In an apparatus for forming beads on a wire, the combination of means for successively forming offset anchoring portions in the wire at spaced intervals, means for assembling charges of granular fusible material about the offset anchoring portions and means for fusing the charges thus formed into solid bodies about the anchor portions of the wire.

10. In an apparatus of the character set forth in claim 9 wherein the means for forming the charges of granular fusible material about the wire is manually operated.

11. In an apparatus of the character set forth, means for intermittently feeding a wire upon which beads are to be formed, means for forming offset anchoring portions in the wire at spaced intervals, means for assembling charges of granular fusible material about said offset portions of the wire, means for fusing said charges of granular material about the wire and a power drive for coordinating the operation of said means.

12. In an apparatus of the character set forth means for intermittently feeding a wire upon which beads are to be formed, means for forming offset anchoring portions in the wire at spaced intervals, means for assembling charges of granular fusible material about said offset portions of the wire, means for fusing said charges of granular material about the wire and a power drive for coordinating the operation of said means.

13. In an apparatus of the character set forth in claim 11 comprising two sets of fusing means.

14. In an apparatus of the character set forth in claim 11 comprising a heat shield device cooperatively functioning with the fusing means.

15. Means for forming beads on wires, the combination of a relatively fixed container for granular fusible material, a die movable with respect to the container and having at its upper end a charge forming recess, means for reciprocating the die to lower the recess into the container to charge the recess and move upwardly to bring the charge to a predetermined level above the container, means for passing a wire through said die and means for fusing the charge of granular material about the wire.

JOSEPH SCHMIDINGER.

REFERENCES CITED

The following references are of record in the file of this patent:

UNITED STATES PATENTS

| Number | Name | Date |
|---|---|---|
| 359,631 | Prentice | Mar. 22, 1887 |
| 2,030,185 | Rose, Jr. | Feb. 11, 1936 |
| 2,220,742 | Thorson | Nov. 5, 1940 |
| 2,347,421 | Little | Apr. 25, 1944 |
| 2,348,035 | Synek | May 2, 1944 |

FOREIGN PATENTS

| Number | Country | Date |
|---|---|---|
| 558,734 | France | Sept. 1, 1923 |
| 624,239 | France | July 11, 1927 |